United States Patent [19]
Fujii et al.

[11] Patent Number: 5,660,480
[45] Date of Patent: Aug. 26, 1997

[54] EXTERNALLY PRESSURIZED BEARING SPINDLE

[75] Inventors: Shoji Fujii; Shizuka Yamazaki, both of Iwata; Yoshio Fujikawa, Morimachi, all of Japan

[73] Assignee: NTN Corporation, Osaka, Japan

[21] Appl. No.: 690,976

[22] Filed: Aug. 1, 1996

[30] Foreign Application Priority Data

Dec. 18, 1995 [JP] Japan .................................. 7-329189

[51] Int. Cl.$^6$ .................................................. F16C 32/06
[52] U.S. Cl. ........................................ 384/107; 384/111
[58] Field of Search ................................. 384/100, 107, 384/111, 113

[56] References Cited

U.S. PATENT DOCUMENTS

| | | | |
|---|---|---|---|
| 3,493,273 | 2/1970 | Greenberg | 384/111 |
| 4,153,993 | 5/1979 | Kataoka et al. | 384/107 X |
| 4,836,692 | 6/1989 | Hagen | 384/107 |

FOREIGN PATENT DOCUMENTS

| | | |
|---|---|---|
| 1 213 514 | 11/1970 | United Kingdom . |
| 1 557 601 | 12/1979 | United Kingdom . |
| 2 246 176 | 1/1992 | United Kingdom . |

Primary Examiner—Thomas R. Hannon
Attorney, Agent, or Firm—Nikaido, Marmelstein, Murray & Oram LLP

[57] ABSTRACT

An externally pressurized air bearing spindle comprises: a first cylindrical bearing portion having a journal bearing surface opposing an outer circumferential surface of a main shaft with a small journal bearing clearance therebetween, a thrust bearing surface opposing one end surface of a thrust plate disposed on the main shaft with a small thrust bearing clearance therebetween, and plural bearing nozzles formed in the journal bearing surface and the thrust bearing surface and arranged in planes perpendicular to an axis thereof; and a second cylindrical bearing portion having a thrust bearing surface opposing the other end surface of the thrust plate with a small thrust bearing clearance therebetween and plural bearing nozzles formed in the thrust bearing surface and arranged in a plane perpendicular to an axis thereof; the arrangement being such that the main shaft is supported on the bearing surfaces without contact by the action of compressed air fed through the bearing nozzles into the bearing clearances, and that an annular groove is formed between an outer wall of at least one of the first and second bearing portions and an inner wall of an outer case for that one bearing portion so that the bearing nozzles are fed with compressed air from a bearing air feed port formed in the outer case through the annular groove.

7 Claims, 4 Drawing Sheets

EXTERNALLY PRESSURIZED BEARING SPINDLE

BACKGROUND OF THE INVENTION

1. Field of the Invention

The present invention relates to an externally pressurized air bearing spindle device, supporting a spindle or main shaft without making contact by an externally pressurized air bearing, which may be used as a spindle device for drilling machine, precision machine tool, electrostatic painting machine, etc.

2. Description of Related Art

The externally pressurized air bearing supports the main shaft without making contact therewith, and is hence characterized by small friction loss and excellent precision of motion guide. It is hence used as the main shaft bearing for high speed spindle or precision spindle of drilling machine, precision machine tool, electrostatic painting machine, etc.

FIG. 6A and FIG. 6B show an example of a conventional externally pressurized air bearing spindle using an externally pressurized air bearing. This externally pressurized air bearing spindle is of air turbine system, that is, plural recesses 21a1 are provided in the outer circumference of a thrust plate 21a of a main shaft 21, and plural turbine nozzles 22c opened in the tangential direction are provided at positions confronting the recesses 21a1, compressed air supplied from a turbine air feed port 22a through turbine air feed passages 22b and 22d is blown to the recesses 21a1 of the thrust plate 21a from the turbine nozzles 22c in the tangential direction to rotate the main shaft 21. The main shaft 21 driven in this manner is supported by a first bearing portion X' and a second bearing portion Y' without making contact. The turbine nozzles 22c and the turbine air feed passage 22d in the circumferential direction are formed in a turbine nozzle member 22, and the turbine nozzle member 22 is fixed inside of a bearing housing 25 of the second bearing portion Y'.

The first bearing portion X' is composed of a cylindrical bearing housing 23 for composing its outer wall, and a bearing sleeve 24 fitted to the inside of the bearing housing 23 by proper means such as shrinkage fitting, press fitting or adhesion. Inside of the bearing sleeve 24, there is a journal bearing surface 24a confronting the surface on the outer diameter of the main shaft 21 with a small journal bearing clearance, and at the rear end of the bearing sleeve 24, there is a thrust bearing surface 24b confronting the leading end surface of the thrust plate 21a of the main shaft 21 across a small thrust bearing clearance. On the bearing sleeve 24, moreover, there are plural fine bearing nozzles 24c, 24d opened to the thrust bearing surface 24a, and plural fine bearing nozzles 24e opened to the thrust bearing surface 24b. The bearing nozzles 24c, 24d, 24e are arranged in a same cross section orthogonal to the axial line of the bearing sleeve 24.

The second bearing portion Y' is composed of a cylindrical bearing housing 25 coaxially jointed to the rear end of the bearing housing 23, and a bearing sleeve 26 fixed to the inside of the bearing housing 25 by proper means such as shrinkage fitting, press fitting or adhesion. At the leading end surface of the bearing sleeve 26, there is a thrust bearing surface 26b confronting the rear end surface of the thrust plate 21a of the main shaft 21 with a small thrust bearing clearance. In the bearing sleeve 26, moreover, there are plural fine bearing nozzles 26c, opened to the thrust bearing surface 26b. The bearing nozzles 24c are arranged in a same cross section orthogonal to the axial line of the bearing sleeve 26.

As shown in FIG. 6B, joining of the bearing housing 23 of the first bearing portion X' and the bearing housing 25 of the second bearing portion Y' is achieved by mutually joining the junction surfaces of fixing parts 23a, 25a provided for each housing, and inserting a coupling bolt 27 from the side of the fixing part 25a into screw holes 23a1 provided in the fixing part 23a, and tightening.

By the compressed air flowing into each bearing clearance from the bearing nozzles (24c, 24d, 24e, 26c) of the bearing sleeve 24 and bearing sleeve 26, the displacement of the main shaft 21 in the radial direction and thrust direction is suppressed. This compressed air for bearing is supplied from a bearing air feed port 28, passes through radial air feed passages 29, 30, and axial air feed passages 31, 32, enters circumferential air feed passages 33, 34, 35 communicating the bearing nozzles (24c, 24d, 24e, 26c) in the circumferential direction, and flows into bearing clearances through bearing nozzles (24c, 24d, 24e, 26c). The compressed air flowing into the bearing clearances reaches the bearing end through the bearing clearances, and is discharged outside the spindle directly, or through exhaust passages 36, 37. By the pressure distribution of the compressed air occurring in the bearing clearances, the main shaft 21 is supported without contacting the journal bearing surface 24a or thrust bearing surfaces 24b, 26b.

In this way, in the conventional spindle, the first bearing portion X' and second bearing portion Y' for supporting the main shaft 21 without contacting therewith are respectively constructed of the bearing housings (23, 25) and bearing sleeves (24, 26) integrally fitted together, and the main reason is that the circumferential air feed passages (33, 34, 35) for communicating the bearing nozzles (24c, 24d, 24e, 26c) in the circumferential direction cannot be formed if the bearings are built in a single cylinder structure. It is also of the same reason that the turbine nozzle member 22 is provided.

In the field of machine tools mentioned above, recently, in order to improve the productivity, there is a tendency to multiple dimensions and higher speed for positioning of spindle, and as one of the elements for such purpose, reduction of weight of the spindle is an important subject. For example, in the electrostatic painting machine, in order to perform painting more flexible and finely, there is an increasing demand for mounting the spindle on a multiple-joint robot, instead of the conventional reciprocating table, and the reduction of spindle weight will be a great merit from the viewpoint of limitation of the load capacity of the robot.

In this kind of spindle, on the other hand, the dimensions, shape and material of the main shaft are often determined by the functional requirements, such as spindle load capacity, rigidity, elongation by thermal deformation, and wear resistance, and weight reduction of spindle mainly depends on weight reduction of the bearing portions. As the means for such purpose, it may be considered to compose the bearing, especially the bearing housing, by using material of low specific gravity, for example, aluminum alloy and other light metal material, ceramics, synthetic resin, graphite, and other nonmetallic materials (generally the bearing housing is made of stainless steel, and the bearing sleeve is made of bronze alloy), or to reduce the wall thickness of the bearing housing or bearing sleeve.

However, in the conventional spindle as shown in FIGS. 6A and 6B, the bearing portion is an integral structure combining the bearing housing and bearing sleeve, and as compared with the single cylinder structure of same thickness, the rigidity is small structurally. Accordingly, if various means for weight reduction are directly applied to the conventional spindle, due to lowering of rigidity of the bearing portions, the entire spindle may oscillate by acceleration due to imbalance of the main shaft during operation, and the run-out of the main shaft is magnified, and sufficient precision of rotation may not be obtained.

Besides, the conventional spindle is complicated in the structure of the bearing portions, requiring many processes in manufacture of bearing housing and bearing sleeve, and it was generally expensive.

SUMMARY OF THE INVENTION

It is hence a primary object of the invention to solve such problems and present an externally pressurized air bearing spindle of light weight, compact design, low cost, and high precision.

In the invention, a circular groove is formed between the surface on outer diameter of at least one of the first and second bearing portions and the inner surface of the outer case in which the bearing portions are set, and compressed air is supplied into bearing nozzles through the circular groove from the bearing air feed port provided in the outer case. In such constitution, the bearing air feed passage of the bearing portion can be simplified.

Besides, a second circular groove is formed between the surface on outer diameter of at least one of the first and second bearing portions and the inner surface of the outer case in which the bearing portions are set, and a turbine air feed passages to communicate the circular groove and each turbine nozzle individually are formed in that one bearing portion, so that compressed air is supplied from the turbine air feed port provided in the outer case into the turbine nozzles through the circular grooves and turbine air feed passages. Hence, in the spindle of the turbine drive system, the turbine air feed passage is simplified, the turbine nozzle member being eliminated.

In these two arrangements, at least the member for composing the outer wall of the first bearing portion may be formed of a material of low specific gravity, ensuring that the spindle weight may be reduced.

Herein, "at least the member for composing the outer wall" is meant to include the two possibilities of forming only the bearing housing of the material of low specific gravity and forming both bearing housing and bearing sleeve of the material of low specific gravity in the bearing portion in which the structure of fixing the bearing sleeve is fixed to the inner side of the bearing housing. In the bearing portion in which the journal bearing surface and/or and thrust bearing surface are/is directly formed on the bearing housing (i.e. the bearing portion in the single cylinder structure with bearing housing only), the bearing housing is formed of the material of low specific gravity. Meanwhile, not only the first bearing portion, but also the member for composing the outer wall of the second bearing portion may be also formed of material of low specific gravity.

The "material of low specific gravity" refers to any material of which specific gravity is smaller than that of general materials for forming the bearing housing and bearing sleeve, such as stainless steel and bronze alloy, and such material includes aluminum alloy and light metal materials, and ceramics, synthetic resins, graphite, and other nonmetallic materials.

While forming the first bearing portion in a single cylinder structure, the second bearing portion may be also formed in a single cylinder structure. In such constitution, a simple and lightweight spindle may be realized, and at the same time the rigidity of the bearing portion is assured and the required precision of rotation can be maintained.

According to the invention, bearing air feed and turbine air feed are fed from the outer case side through a circular groove formed between the outer wall of the bearing portion and the inner wall of the outer case, and hence the air feed passage of the bearing portion can be simplified, and the manufacturing processes are curtailed and the rigidity of the bearing portion can be enhanced. As a result, the spindle is compact in design, low in cost, and high in rotation precision, and at the same time, while maintaining the rotation precision of the spindle, the bearing portion may be made of material of low specific gravity or formed in a single cylinder structure, and moreover means for reducing the weight such as forming in a thin wall thickness may be executed.

DESCRIPTION OF PREFERRED EMBODIMENTS

Figure 1:
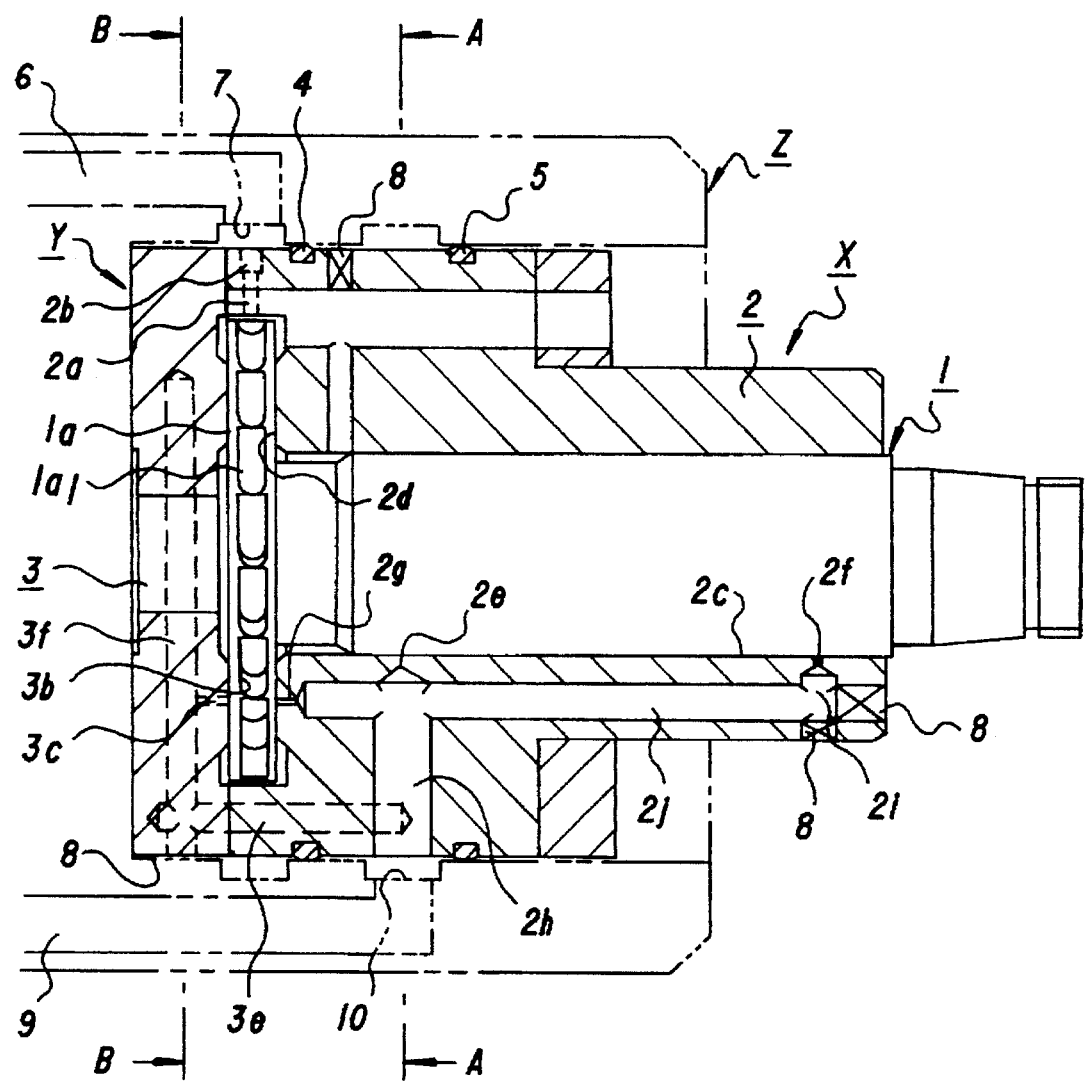
FIG. 1 is a longitudinal sectional view showing a spindle according to an embodiment of the invention.

Referring now to the drawings, embodiments of the invention will be described in detail.

FIG. 1 is a longitudinal sectional view of an externally pressurized air bearing spindle in an embodiment of the invention along an axial line. The externally pressurized air bearing spindle of the invention mainly comprises a main shaft 1 for making rotary motions, and a first bearing portion X and a second bearing portion Y for supporting the main shaft 1 without making contact. The first bearing portion X is a single cylinder structure comprising a bearing housing 2, and the second bearing portion Y is a single cylinder structure comprising a bearing housing 3, and neither comprises bearing sleeves (24, 26) of the conventional spindle shown in FIG. 6. In this embodiment, the bearing housing 2 is formed of nonmetallic material such as ceramics, synthetic resin and graphite, while the bearing housing 3 is formed of light metal material such as aluminum alloy. Such first bearing portion X and second bearing portion Y are fitted and set inside of an outer case Z, and a pair of O-rings 4, 5 are interposed between the two.

Figure 6A:
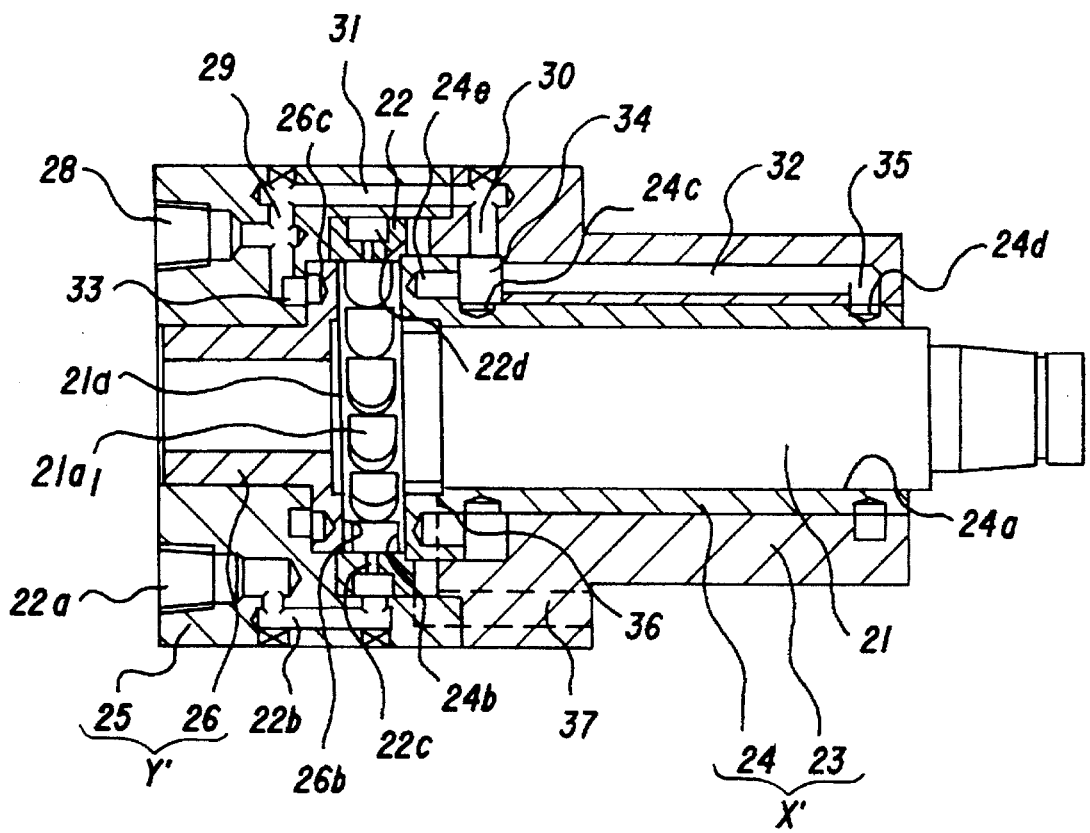
FIG. 6A and FIG. 6B are longitudinal sectional views showing a conventional spindle.
Figure 6B:
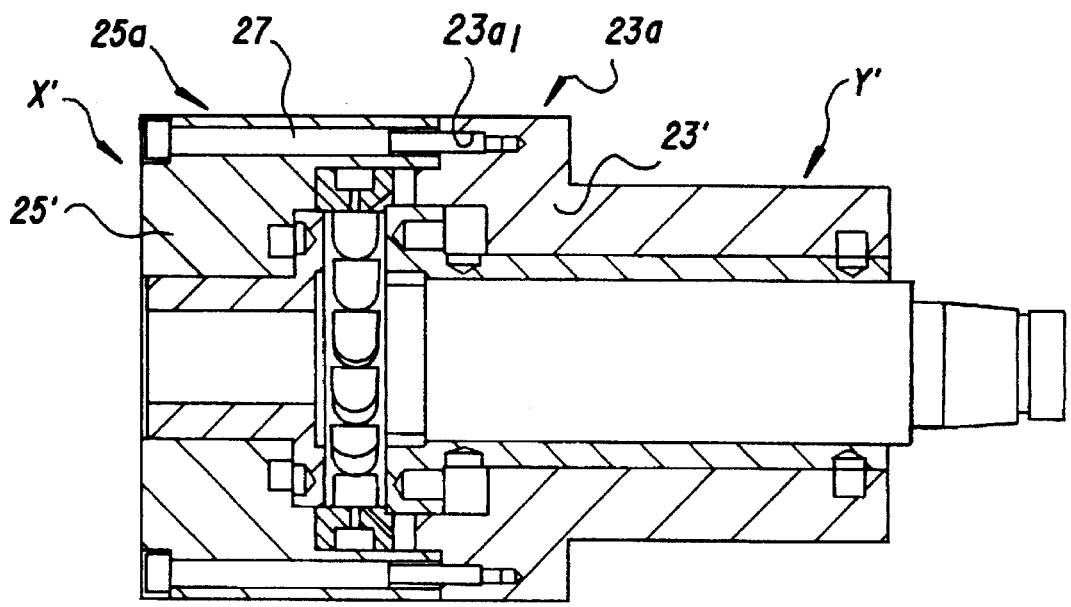

The driving system of the main shaft 1 is the air turbine driving system same as in the conventional spindle shown in FIG. 6, that is, plural recesses 1a1 are formed in the outer circumference of a thrust plate 1a of the main shaft 1, plural turbine nozzles 2a opened in the tangential direction are provided at positions confronting the recesses 1a1, and compressed air is blown to the recesses 1a1 of the thrust plate 1a from the turbine nozzles 2a in the tangential direction, thereby rotating the main shaft 1. In this embodiment, however, the turbine nozzles 2a are directly formed in the bearing housing 2, and air intake into the turbine nozzles 2a is fed through a turbine air feed port 6 formed in the outer case Z, a circular groove 7 formed in the inner wall of the outer case Z (this circular groove may be formed in the surface on outer diameter of the bearing housing 2), and plural turbine air feed passages 2b formed in the bearing housing 2. Each turbine nozzles 2a communicates with each turbine air feed passage 2b, and all turbine air feed passages 2b communicate with the circular groove 7. The compressed air supplied from compressed air source not shown into the turbine air feed port 67 of the outer case Z flows into the turbine air feed passages 2b through the circular groove 7, and is supplied to the turbine nozzles 2a. In such constitution, the turbine nozzle member as extra member in the conventional spindle is not needed, and the turbine air feed passages may be simplified. The main shaft 1 thus driven is supported by the bearing housing 2 as the first bearing portion X and the bearing housing 3 as the second bearing portion Y without making contact therewith.

Figure 2:
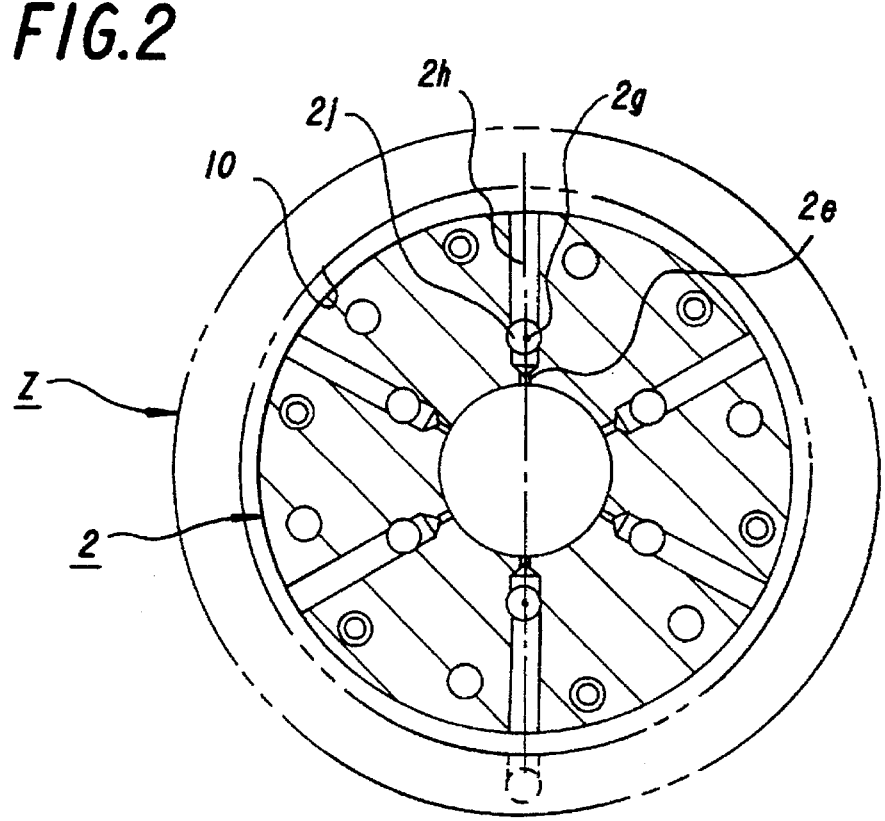
FIG. 2 is a cross sectional view A—A in FIG. 1.

Inside of the bearing housing 2 is directly formed a journal bearing surface 2c confronting the surface on outer circumference of the main shaft 1 with a small journal bearing clearance, and at its rear end, moreover, there is a thrust bearing surface 2d formed directly, confronting the leading end of the thrust plate 1a of the main shaft 1 with a small thrust bearing clearance. In the journal bearing surface 2a, plural fine bearing nozzles 2e and 2f are opened, while plural fine bearing nozzles 2g are opened in the thrust bearing surface 2b. The bearing nozzles 2e, 2f, and 2g are identical in number (six each in this embodiment), and are respectively disposed in a same cross section orthogonal to the axial line of the housing 2 (see FIG. 2: cross section A—A in FIG. 1). In the bearing housing 2, there are bearing air feed passages (radial air feed passages 2h, 2i, and axial air feed passages 2j) for mutually communicating the bearing nozzles 2e, 2f, 2g in a same longitudinal section along the axial line.

The radial air feed passages 2h, 2i and axial air feed passages 2j can be both formed by drilling by controlling the feed of the cutting tool (drill, etc.) from the outer surface of the housing to the specified position in each direction. In this way, the bearing air feed passages can be formed by drilling the bearing housing 2 made of a single cylindrical member, and plugging the openings on the outer surface, as required, by sealing means such as plugs and resin molds.

The compressed air is fed to the bearing nozzles (2e, 2f, 2g), through the bearing air feed port 9 on the outer case Z, the circular groove 10 formed on the inner wall of the outer case Z (this circular groove may be formed on the outer wall of the bearing housing 2), and the bearing air feed passages (2h, 2i, 2j). All bearing air feed passages (2h, 2i, 2j) communicate with the circular groove 10. The compressed air supplied from the compressed air source not shown into the bearing air feed port 9 of the outer case Z flows into the bearing air feed passages (2h, 2i, 2j) from the circular groove 10, and is supplied into the bearing nozzles (2e, 2f, 2g). The clearance between the circular groove 7 and circular groove 10 is sealed by an O-ring, and it is arranged so that bearing air feed and turbine air feed may be done independently.

Figure 3:
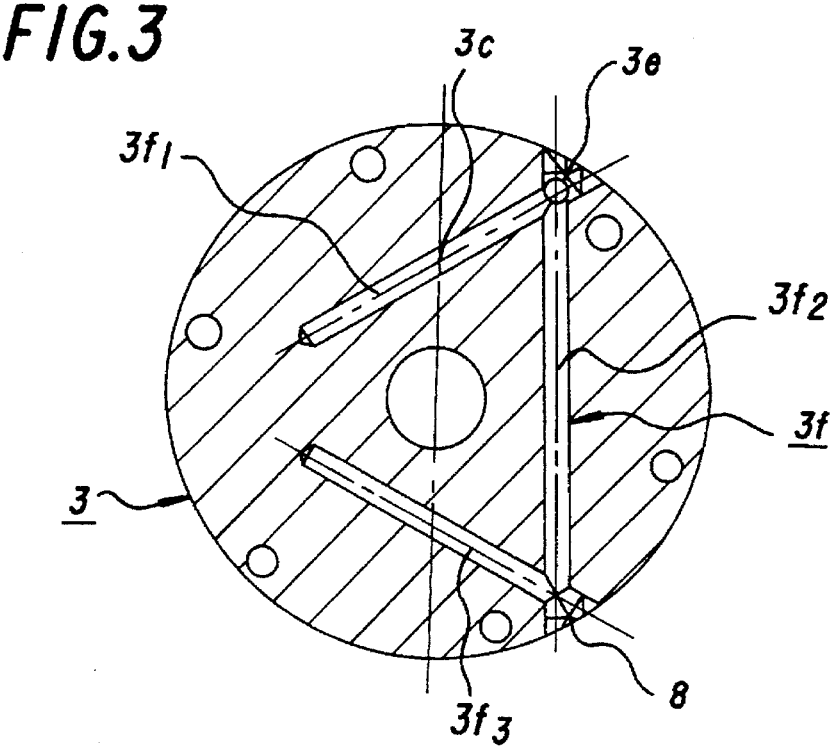
FIG. 3 is a cross sectional view B—B in FIG. 1.

At the leading end of the bearing housing 3, there is a thrust bearing surface 3b confronting the rear end of the thrust plate 2a with a small thrust bearing clearance. In the thrust bearing surface 3b, plural fine bearing nozzles 3c are opened. The bearing nozzles 3c are arranged in a cross section orthogonal to the axial line of the bearing housing 3. The bearing housing 3, moreover, as shown in FIG. 3 (cross section B—B in FIG. 1), is provided with a series of polygonal air feed passages 3f in a polygonal shape on the whole for communicating with the bearing nozzles 3c in the circumferential direction. In this embodiment, the polygonal air feed passages 3f are nearly in triangular shape, and three straight passage portions 3f1, 3f2, 3f3, forming each side correspond to two bearing nozzles 3c each, thereby communicating six (all in this embodiment) bearing nozzles 3c on the whole in the circumferential direction. The polygonal air feed passages 3f communicate with the radial air feed passages 2h of the bearing housing 2 through the axial air feed passages 3e.

The polygonal air feed passages 3f are formed by drilling by controlling the feed of the machining tool from the outer surface of the housing 3 to the specified positions in the direction of the passage portions 3f1, 3f2, 3f3. Similarly, the axial air feed passages 3e are formed by drilling from the end of the housing 3 to the special positions in the axial direction. In this way, the air feed passages are formed by drilling the bearing housing 3 made of a single cylindrical member, and plugging the outer side openings, as required, by sealing means 8 such as plugs and resin molds.

The compressed air supplied into the bearing air feed port 9 of the outer case Z flows into the polygonal air feed passages 3f through the radial air feed passages 2h and axial air feed passages 3e from the circular groove 10, and is supplied to the bearing nozzles 3c.

In this manner, the externally pressurized air bearing spindle of the embodiment has the first bearing portion X and second bearing portion Y formed in a single cylinder structure, and the rigidity of the bearing portion is enhanced as compared with the conventional spindle, and, as a result, not only the rotation precision of the spindle is enhanced, but also the means for reducing weight may be put in use, for example, by forming the bearing portion by using material of low specific gravity or reducing the wall thickness, while maintaining the rotation precision of the spindle. Moreover, since the bearing air feed passages and turbine air feed passages are very simplified, the manufacturing process for forming passages is curtailed, and especially in the bearing housing 2, since the bearing nozzles and turbine nozzles can be inspected from outside, the nozzles can be cleaned easily in the manufacturing process or in maintenance.

Figure 4:
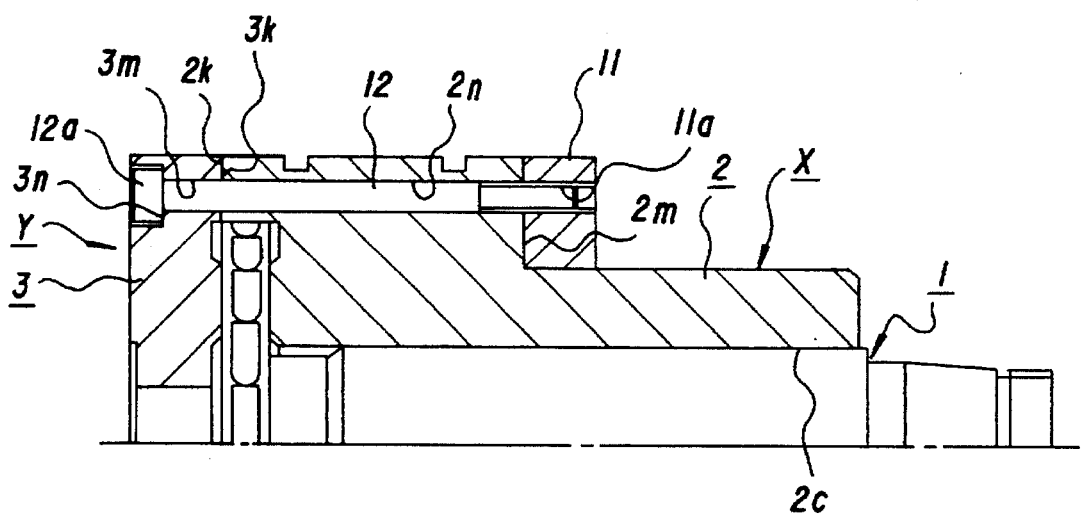
FIG. 4 is a longitudinal sectional view showing a longitudinal section different from that of FIG. 1.

Such bearing housing 2 as the first bearing portion X and bearing housing 3 as second bearing portion Y are, after assembling the main shaft 1, fixed coaxially and integrally by fixing means such as coupling bolts 12 by mutually matching the junction surfaces 2k, 3k provided at each end as shown in FIG. 4.

A step part 2m is provided on the outer circumference of the bearing housing 2, and an annular member 11 is press-fitted, adhered or properly fixed to the step part 2m. The annular member 11 is made of, for example, metal material, and has screw holes 11a in the number corresponding to the number (about six) of the coupling bolts 12. In the bearing housing 2, plural bolt holes 2n in the same phase as the screw holes 11a of the annular member 11 are penetrated.

In the bearing housing 3, plural bolt holes 3m are penetrated in the same phase as the screw holes 11a and bolt holes 2n, and there are also seats 2n on which heads 12a of the coupling bolts 12 are seated.

The bearing housing 2 and bearing housing 3 are coupled by mutually joining the junction surfaces 2k, 3k, inserting the coupling bolts 12 into the bolt holes 3m, 2n from the bearing housing 3 side, and tightening them into the screw holes 11a of the annular member 11. Since the screw holes 11a are formed in the metal annular member 11, if the bearing housing 2 is made of the nonmetallic material and the weight of the bearing portion is reduced, there is no risk of damage of the screw holes 11a. The seats 3n on which the heads 12a of the coupling bolts 12 are seated are provided in the bearing housing 3 made of light metal material. Hence, the coupling bolts 12 can be tightened with a sufficient torque, and a necessary rigidity for the bearing can be maintained. Furthermore, by fixing the metallic annular member 11 preliminarily to the outer diameter of the bearing housing 2 (before processing the journal bearing surface 2c), and processing the journal bearing surface 2c while chucking the outer diameter of the annular member 11, deformation of the bearing housing 2 due to chuck force can be reduced, and the journal bearing surface 2c can be processed at high precision.

Figure 5:
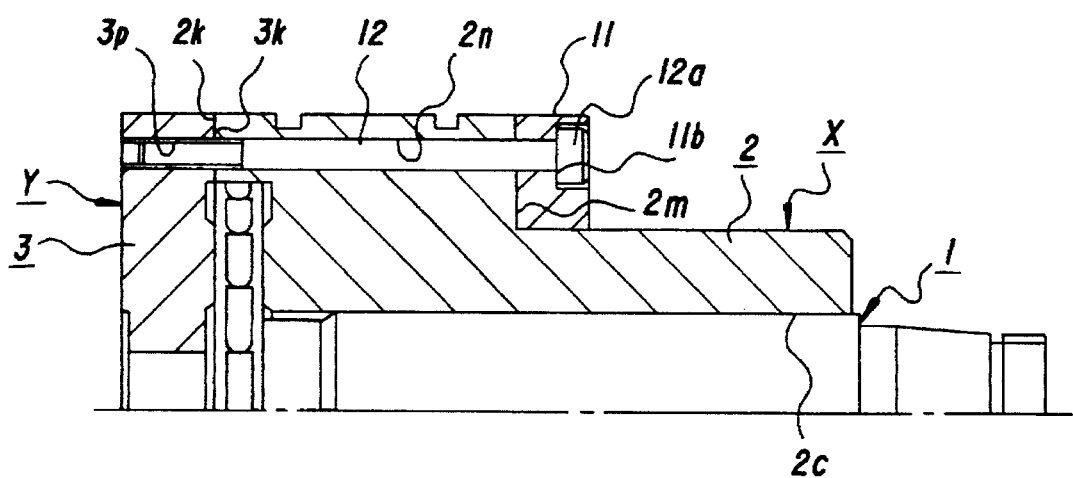
FIG. 5 is a longitudinal sectional view showing a spindle according to a different embodiment of the invention.

In an embodiment shown in FIG. 5, seats 11b on which the heads 12a of the coupling bolts 12 are seated are formed in the annular member 11, and screw holes 3p for accepting the coupling bolts 12 are formed in the bearing housing 3.

In this way, when the weight is reduced by forming the bearing housings (2, 3) by using material of low specific gravity, light metal materials such as aluminum alloy, and nonmetallic materials such as ceramics, synthetic resin, and graphite can be used as the material of low specific gravity. Above all, considering the durability in the case of contact of the main shaft 1 and bearing surface due to overload or the like, the synthetic resin, graphite and others having self-lubricity are preferred. Examples of synthetic resins having self-lubricity include fluoroplastics, polyamide resin, polyimide resin, polyether-ether ketone, other ketone resins, and polyphenylene sulfide resin. Alternatively, the bearing surface of the bearing housing (especially when forming the bearing housing by using metal material of low specific gravity) may be coated with a layer of solid lubricant such as fluoroplastics, molybdenum disulfide, and hexagonal system boron nitride, or material of excellent wear resistance such as Si, SiC, and TiC, by resin coating, disperse plating, vapor deposition, or other method.

In the embodiment, in the bearing housing 3 is designed so that the compressed air to the bearing nozzle 3c is fed through the polygonal air feed passages 3f shown in FIG. 3, same as in the bearing housing 2, it may be designed to feed air to the bearing nozzles 3c by forming bearing air feed passages directly penetrating into the bearing air feed port and circular groove of the outer case Z (the circular groove is formed in addition to the circular grooves 7 and 10). Moreover, the bearing portion of the invention is not limited to the constitution of single cylinder structure of bearing housing, but the bearing portion may be also built in an integrated combined structure of bearing housing and bearing sleeve. The invention may be applied not only to the externally pressurized air bearing spindle of air turbine drive system, but also to externally pressurized air bearing spindle of drive system by induction motor, various servo motor and other motors.

What is claimed is:

1. An externally pressurized air bearing spindle comprising a cylindrical first bearing portion, which has a journal bearing surface confronting a surface on outer circumference of a main shaft with a small journal bearing clearance, a thrust bearing surface confronting one end surface of a thrust plate formed on the main shaft with a small thrust bearing clearance, and a plurality of bearing nozzles arranged in respective planes perpendicular to an axis thereof and directed towards the journal bearing surface and thrust bearing surface, and a cylindrical second bearing portion, having a thrust bearing surface confronting other end surface of the thrust plate on the main shaft with a small thrust bearing clearance, and a plurality of bearing nozzles arranged in a plane perpendicular to an axis thereof and directed towards the thrust bearing surface, thereby supporting the main shaft without contact by feeding compressed air into each bearing clearance through each bearing nozzle, wherein a circular groove is formed between the surface on outer diameter of at least one of the first and second bearing portions and the inner surface of an outer case for the bearing portions, and compressed air is supplied to the bearing nozzles through the circular groove and axial air feed passages from a bearing air feed port formed in the outer case.

2. An externally pressurized air bearing spindle of claim 1, wherein plural recesses are formed in the outer circumference of the thrust plate of the main shaft, plural turbine nozzles opened in the tangential direction at a position confronting the recesses are provided in one of the first bearing portion and second bearing portion, and compressed air is blown to the recesses from the turbine nozzles in the tangential direction to rotate the main shaft, and a second circular groove is formed between the surface on outer diameter of one bearing portion and the inner surface of the outer case in which the bearing portions are set, a turbine air feed passages is formed in one bearing portion to communicate the second circular groove and the each turbine nozzle individually, and compressed air is supplied to the turbine nozzles through the second circular groove and the turbine air feed passages from the turbine air feed port formed in the outer case.

3. An externally pressurized air bearing spindle of claim 2, wherein the member for composing at least the outer wall of the first bearing portion is made of a material of low specific gravity.

4. An externally pressurized air bearing spindle of claim 2, wherein at least the first bearing portion is of a single cylinder structure.

5. An externally pressurized air bearing spindle of claim 1, wherein the member for composing at least the outer wall of the first bearing portion is made of a material of low specific gravity.

6. An externally pressurized air bearing spindle of claim 5, wherein at least the first bearing portion is of a single cylinder structure.

7. An externally pressurized air bearing spindle of claim 1, wherein at least the first bearing portion is of a single cylinder structure.

* * * * *